United States Patent [19]

Brook

[11] Patent Number: 5,176,753
[45] Date of Patent: Jan. 5, 1993

[54] CONCRETE ADMIXTURE COMPOSITIONS

[76] Inventor: John W. Brook, 12721 State Route 44, Mantua, Ohio 44255

[21] Appl. No.: 790,950

[22] Filed: Nov. 12, 1991

Related U.S. Application Data

[63] Continuation of Ser. No. 730,321, Jul. 15, 1991, abandoned, which is a continuation of Ser. No. 619,150, Nov. 27, 1990, abandoned, which is a continuation of Ser. No. 527,392, May 23, 1990, abandoned, which is a continuation of Ser. No. 420,204, Oct. 12, 1989, abandoned, which is a continuation of Ser. No. 322,277, Mar. 10, 1989, abandoned, which is a continuation of Ser. No. 91,238, Aug. 31, 1987, abandoned, which is a continuation-in-part of Ser. No. 909,524, Sep. 19, 1986, abandoned.

[51] Int. Cl.⁵ ............................................. C04B 24/00
[52] U.S. Cl. ..................................... 106/819; 106/724; 106/727; 106/728; 106/725; 106/802; 106/808; 106/809; 106/810; 106/822; 106/823

[58] Field of Search ............... 106/724, 727, 728, 725, 106/802, 808, 809, 810, 819, 822, 823

[56] References Cited

U.S. PATENT DOCUMENTS

4,606,770  8/1986  Gerber .................................. 106/727

Primary Examiner—Karl Group
Assistant Examiner—Anthony J. Green
Attorney, Agent, or Firm—Gerald D. Sharkin; Richard E. Vila; Walter F. Jewell

[57] ABSTRACT

A chloride-free admixture for use as a cold weather (e.g., 13° F. to 40° F.) concrete set accelerator. The admixtures comprise;
  1) at least one soluble inorganic salt having freezing point depressant properties,
  2) at least one water reducing dispersant, e.g., superplasticizer,
  3) at least one inorganic early set and strength accelerator, and optionally,
  4) at least one inorganic set accelerator.

8 Claims, No Drawings

CONCRETE ADMIXTURE COMPOSITIONS

This is a continuation of application Ser. No. 07/730,321, filed Jul. 15, 1991, which in turn is a continuation of application Ser. No. 07/619,150, filed Nov. 27, 1990, which in turn is a continuation of application Ser. No. 07/527,392, filed May 23, 1990, which in turn is a continuation of application Ser. No. 07/420,204, filed Oct. 12, 1989, which in turn is a continuation of application Ser. No. 07/322,277, filed Mar. 10, 1989, which in turn is a continuation of application Ser. No. 07/091,238, filed Aug. 31, 1987, which in turn is a continuation-in-part of application Ser. No. 06/909,256, filed Sept. 19, 1986, all of which are now abandoned.

BACKGROUND OF THE INVENTION

This invention relates to concrete admixtures. In one particular aspect it relates to concrete admixtures for use as cold weather concrete set accelerators, and to methods for their use.

Low or freezing temperatures (e.g., 40° to 15° F.) presents special problems in mixing, placing and curing of concrete. Concrete may freeze while saturated and subsequently be of low strength, or there may be a slow development of strength.

The American Concrete Institute (ACI) Report 306R-78 on Cold Weather Concreting, sets forth standard practices to prevent freezing, and assure the safe development of concrete strength during curing at ambient freezing conditions. Heating of materials, including mix water and aggregates, are mandatory. Protective insulating coverings, heating enclosures and proper curing conditions are described.

An additional factor (not often reported) associated with freezing temperatures, is the distress of the concrete worker operating under adverse conditions. Even if dressed warmly, the concrete worker wishes to finish a pour or complete the finishing as fast as possible, and move indoors out of the wind and cold. Thus, an accelerated set time is an important aspect of cold weather concreting.

While the prior art has addressed the problems of using concrete in cold weather (e.g., the use of calcium chloride as the principle accelerating admixture), it has not successfully developed admixtures which are, (1) non-corrosive, and (2) meet or exceed the rate-of-hardening and compressive strength performance at about 13° to 40° F., of a plain concrete mix at 50° F.

The present invention provides admixture compositions which meet these prior art limitations.

THE INVENTION

Broadly, the present invention provides a chloride-free admixture for use as a cold weather concrete set accelerator which comprises (1) 100 parts by weight of at least one soluble inorganic salt having freezing point depressant properties, (2) from 13.3 to 30 parts by weight of at least one water-reducing dispersant, e.g., superplasticizer, (3) from 3 to 30 parts by weight of at least one inorganic early set and strength accelerator, and (4) from 0 to 10 parts by weight of at least one organic set accelerator.

Preferably the quantity of component 2 should be greater than 15 parts by weight.

Preferably the quantity of component 3 is from 5 to 10 parts by weight.

Preferably component 4 is present in an amount of from 1.3 to 6 parts by weight.

The proportions given above are parts by dry weight of the total weight of components 1-4, neglecting any water which may be present. The admixture of the invention may be added as a solid direct to the concrete mix water. Preferably the admixture is in the form of an aqueous solution.

The set accelerating admixtures of this invention combine two beneficial effects:

(1) They depress the mix water freezing point, so that a concrete mix will not freeze during the first few critical hours of curing at temperatures below 32° F., and (2) They reduce the quantity of mix water necessary for curing, which improves early concrete strength development. The reduction in mix water also has an effect on freezing point depression, because it allows for a more concentrated solution of the admixture.

DESCRIPTION OF PREFERRED EMBODIMENTS

Component 1 is preferably selected from ammonium, alkali and alkaline earth nitrates and nitrites, more preferably from calcium and sodium nitrate and nitrite. Calcium nitrate is particularly preferred. Up to 50% of the inorganic salt of component 1 may be replaced by urea.

Component 2 is preferably an alkali or alkaline earth salt of a napthalene sulphonate/formaldehyde condensate, more preferably a sodium or calcium salt or an acrylic copolymer, e.g., poly[hydroxy ethyl methacrylate/acrylic acid]. Particularly preferred is napthalene sulphonate/formaldehyde condensate in sodium salt form.

Component 3 is preferably selected from ammonium, alkali or alkaline earth thiocyanates and thiosulphates, more preferably from calcium, ammonium and sodium thiocyanates. Particularly preferred is sodium thiocyanate.

Component 4 is preferably selected from methylolgylclurils, dimethylolurea, mono- and di-(N-methylol) hydantoin, mono-and di(N-methylol) dimethylhydantoin, N-methylolacrylamide, tri-(N-methylol) melamine, N-hydroxyethylpiperidine, N,N-bis(2-hydroxyethyl)piperazine, glutaraldehyde, pyruvaldehyde, furfural and water soluble urea-formaldehyde resins. More preferably, component 4 is selected from methylolglycolurils, e.g., tri(N-methylol)glycoluril and tetra (N-methylol)blydoluril, particularly tetra (N-methylol)-glycoluril.

A preferred admixture according to the invention consists of (1) calcium nitrate, (2) sodium salt of naphthalene sulphonate/formaldehyde condensate, (3) sodium thiocyanate and (4) tetra(N-methylol)glycoluril, in the proportions by weight: 100 parts (1), 20 parts (2), 6.7 parts (3) and 4 parts (4). This preferred admixture is preferably used in the form of an aqueous solution containing 40%-60% dry weight of components 1-4, particularly 50% wt.

The admixtures of the invention may be used over a wide range of temperatures from about 70° F. to about −5° F. The amount of admixture which is added to the concrete may be from 0.13 to 5.6 parts (dry weight) per 100 parts dry weight of cementitious material in the concrete (e.g., portland cement plus pozzolanic material such as fly ash). For the above preferred admixture, the dose range is from 1.3 to 4.6 parts/100 parts cement, and the lower the ambient temperature the higher will be the dosage required. Thus a dosage of 2.6 parts/100 parts cement of the preferred admixture will prevent a concrete mix from freezing at temperatures down to about −6° F., while for lower temperatures a dosage of 3.9 parts/100 parts cement is preferred.

While the admixture of the invention may be used with any of ASTM type I to V cements, types I and II are preferred. The admixtures may be used in cement motors as well as in concrete.

The invention also provides a method for accelerating the set of a concrete or cement mortar mix, suitable for use in cold weather conditions, comprising adding to the mix from 0.13 to 5.6 parts (dry weight) of an admixture according to the invention per 100 parts dry weight of cementitious material in the mix. The concrete or cement mortar so obtained will contain the following amounts of components 1–4, defined above:

| Component | parts/100 parts cement |
| --- | --- |
| 1 | 0.5–4.0 |
| 2 | 0.1–0.8 |
| 3 | 0.033–0.6 |
| 4 | 0.0–0.16 |
| | preferably 0.02–0.16 |
| Preferred amounts are: | |
| 1 | 2.0–3.0 |
| 2 | 0.4–0.6 |
| 3 | 0.1–0.6 |
| 4 | 0.04–0.12 |

A similar method which may be substituted for that already described, comprises adding to the concrete or cement mortar (A) 0.5 to 4% by weight of cement of at least one component 1),
(B) 0.1 to 0.8% by weight of cement of at least one component 2),
(C) 0.033 to 0.6% by weight of cement of at least one component 3), and
(D) 0 to 0.16% of cement of a least one component 4).

In the preferred method, at least one component 4) is added in the amount of from 0.02 to 0.16% wt. of cement.

In the Example the following terms are used in the Tables.

| | |
| --- | --- |
| Formula | Plain refers to a concrete mix without admixture. It is used as a reference. The letters A to CC refer to the admixture formulas set out in the chart below. |
| Dose | Amount of admixture added in fluid ounces per 100 lbs. of cement. |
| Slump | The drop in inches of a 12 inch cone. ASTM C 143 |
| Air | The percent of entrained air. |
| Water Red | Refers to the amount in % of water reduced from the plain concrete mix. The amount listed for the plain mix is the initial starting amount in lbs./cu. yd. |
| PSI/Percent | PSI = pounds per square inch of compressive strength of a concrete sample. The percent is the percent of increase or decrease of breaking strength based on the plain mix at 100%. |
| Micro-Air | An admixture for entraining air in concrete. The admixture meets the requirements of ASTMC-260, AASHTO M-154 and CRD-C13. (Master Builders - Cleveland OH). |
| MB-VR | An admixture for entraining air in concrete. (Master Builders Neutralised VINSOL). The admixture meets the requirements of ASTM C-260, AASHTO M-154 and CRD-C13. |
| ROH | Rate of Hardening. The time in hours to reach initial set. For plain concrete it is the actual time in hours to reach initial set. The ROH for admixture concrete is the difference in set time between plain and admixture concrete. ROH of admixture minus ROH of plain equals relative ROH of admixture concrete. ASTM C 403-80. |

All concrete mixes were based on a cubic yard formula of about 4000 lbs.

(1) Cement (Type I) 517 lbs.
(2) Sand and Stone about 3200 lbs. Sand to Stone ratio of 40:60 to 50:50. The stone used was ¼ in. topsize crushed limestone.
(3) Water as indicated in the Tables.
4) Admixture as indicated in the Tables.

The procedure for the experiments was as follows:

Concrete mixes with addition of admixtures of the invention are prepared according to the concrete formulation of the plain reference. Mixing together the concrete component and the admixtures is carried cut as follows:

Mix water in the amount of about 80 % of that of the plain reference is added to a conventional cement mixer and the admixture then added to the water. The cement, sand and stone are further added.

Then the remaining 20% of water is used in part to adjust the slump to the slump of the plain reference.

The concrete is then poured into 10 cm cubes which are covered to prevent moisture loss. The concrete cubes are stored for the time and at the temperature indicated in Examples I to VI.

| ADMIXTURE FORMULATIONS FORMULA/POUNDS PER 100 LBS. OF CEMENT | | | | | | | | | | | |
| --- | --- | --- | --- | --- | --- | --- | --- | --- | --- | --- | --- |
| Materials | A | B | C | D | E | F | G | H | I | J | K |
| (1) Calcium nitrate | 3.500 | 3.000 | 3.000 | 3.000 | 3.000 | 3.000 | 3.000 | 3.000 | 3.000 | 2.500 | 2.500 |
| (2) Sodium salt of naphthalene sulfonate-formaldehyde resin | 0.700 | 0.600 | 0.600 | 0.600 | 0.600 | 0.400 | 0.400 | 0.400 | 0.400 | 0.500 | 0.500 |
| (3) Sodium thiocyanate | 0.233 | 0.600 | 0.600 | 0.200 | 0.200 | 0.600 | 0.600 | 0.200 | 0.200 | 0.400 | 0.167 |
| (4) Tetra (N-methylol) glycoluriel | 0.117 | 0.120 | 0.049 | 0.120 | 0.040 | 0.120 | 0.040 | 0.120 | 0.040 | 0.080 | 0.100 |
| (5) Water | Added to give dose rate indicated in the Tables. | | | | | | | | | | |
| Materials | L | M | N | O | P | Q | R | S | T | U | V |
| (1) Calcium nitrate | 2.000 | 2.000 | 2.000 | 2.000 | 2.000 | 2.000 | 2.000 | 2.000 | 2.000 | 1.500 | 1.000 |
| (2) Sodium salt of naphthalene sulfonate-formaldehyde | 0.600 | 0.600 | 0.600 | 0.600 | 0.400 | 0.400 | 0.400 | 0.400 | 0.400 | 0.300 | 0.200 |

ADMIXTURE FORMULATIONS
FORMULA/POUNDS PER 100 LBS. OF CEMENT

-continued

| resin | | | | | | | | | | | |
|---|---|---|---|---|---|---|---|---|---|---|---|
| (3) Sodium thiocyanate | 0.600 | 0.600 | 0.200 | 0.200 | 0.600 | 0.200 | 0.200 | 0.133 | 0.060 | 0.100 | 0.66 |
| (4) Tetra (N-methylol) glycoluriel | 0.120 | 0.040 | 0.120 | 0.04 | 0.04 | 0.120 | 0.040 | 0.080 | 0.120 | 0.060 | 0.04 |
| (5) Water | Added to give dose rate indicated in the Tables. | | | | | | | | | | |

| Materials | W | X | Y | Z | AA | BB | CC | DD |
|---|---|---|---|---|---|---|---|---|
| (1) Calcium nitrate | 3.000 | 3.000 | | 2.000 | 3.000 | 3.000 | 3.000 | 3.000 |
| (1) Calcium nitrate | | | 3.000 | 1.000 | | | | |
| (2) Calcium Napthalene Sulfonate | 0.600 | 0.600 | | | | | | |
| (2) Napthalene Sulfonate formaldehyde Condensate | | | 0.600 | 0.600 | 0.600 | 0.600 | 0.600 | 0.600 |
| (3) Sodium Thiocyanate | 0.200 | | 0.200 | 0.200 | 0.200 | 0.200 | 0.200 | 0.200 |
| (4) Tetra (N-Methylol) Glycoluriel | 0.120 | 0.120 | 0.120 | 0.120 | | | | |
| (4) Ammonium Thiocyanate | | 0.200 | | | | | | |
| (4) Pyruvic Aldehyde | | | | | 0.1200 | | | |
| (4) Glutaraldehyde | | | | | | | 0.1200 | |
| (4) N-Hydroxyethyl-pyridine | | | | | | 0.1200 | | |
| (4) N-N-Bis(2-Hydroxyethyl) Piperazine | | | | | | | | 0.1200 |
| Sodium Acetate* | 0.042 | 0.042 | 0.042 | 0.042 | 0.042 | 0.042 | 0.042 | 0.042 |
| Water | Added to give dose rate indicated in the tables | | | | | | | |

*Sodium Acetate - buffering agent to maintain concrete pH from Ph 4-7.

EXAMPLE

The results of Tables I to VI show that the admixture compositions of this invention are capable of protesting concrete systems against freezing down to 16° F. Table VI shows that the admixtures also give satisfactory results when used at temperatures up to 70° F.

TABLE I

| | | | | | | | PSI/Percent | | | |
|---|---|---|---|---|---|---|---|---|---|---|
| Trial | Formula | Dose | Slump | Air | ROH | Water Red. | 1 Day | 3 Day | 7 Day | 28 Day |
| 0 | Plain | — | 7.25 | 6.8 | Frozen | 286.0 lbs. | 54 | 353 | 1050 | 2732 |
| | Micro-Air | 0.65 | | | | | 100 | 100 | 100 | 100 |
| 1 | CaCl$_2$ | 2.00 | 7.50 | 5.9 | Frozen | −4.9% | 100 | 671 | 1775 | 4513 |
| | Micro-Air | 0.59 | | | | | 185 | 190 | 169 | 165 |
| 2 | U | 45.00 | 7.50 | 6.8 | 5.500* | −4.9% | 134 | 647 | 1762 | 4279 |
| | Micro-Air | 0.77 | | | | | 248 | 183 | 168 | 157 |
| 3 | D | 90.00 | 7.00 | 6.0 | 5.130* | −5.2% | 164 | 852 | 2718 | 4979 |
| | Micro-Air | 0.74 | | | | | 304 | 241 | 259 | 182 |

All concrete samples (0 to 3) were made at 40° F., placed at 20° F., and cured at variable temperatures of from 6° to 66° F.
*actual times

TABLE II

| | | | | | | | PSI/Percent | | | |
|---|---|---|---|---|---|---|---|---|---|---|
| Trial | Formula | Dose | Slump | Air | ROH | Water Red. | 1 Day | 3 Day | 7 Day | 28 Day |
| 0 | Plain | — | 5.00 | 1.9 | 7.82 | 296.0 lbs. | 399 | 1675 | 2961 | 5259 |
| | | | | | | | 100 | 100 | 100 | 100 |
| 1 | A | 105.00 | 5.00 | 3.0 | −4.57 | 10.1% | 388 | 1234 | 3201 | 6347 |
| | | | | | | | 97 | 74 | 108 | 121 |
| 2 | D | 90.00 | 5.25 | 2.7 | −4.20 | 9.8% | 390 | 1091 | 3208 | 6369 |
| | | | | | | | 98 | 65 | 108 | 121 |
| 3 | K | 75.00 | 5.00 | 2.3 | −4.20 | 7.1% | 303 | 675 | 2815 | 5200 |
| | | | | | | | 76 | 40 | 95 | 99 |
| 4 | S | 60.00 | 5.00 | 2.2 | −4.32 | 9.5% | 409 | 834 | 3190 | 5641 |
| | | | | | | | 103 | 50 | 108 | 107 |
| 5 | U | 45.00 | 5.00 | 1.8 | −3.07 | 7.1% | 393 | 800 | 2339 | 5284 |
| | | | | | | | 98 | 48 | 96 | 100 |

Trial #0 Plain concrete made and cured at 50° F.
Trials #1-5 concrete samples made at 50° F., cured at 16-20° F. for 3 days, then cured at 50° F.

TABLE III

| | | | | | | | PSI/Percent | | | |
|---|---|---|---|---|---|---|---|---|---|---|
| Trial | Formula | Dose | Slump | Air | ROH | Water Red. | 1 Day | 3 Day | 7 Day | 28 Day |
| 0 | Plain | — | 4.75 | 5.0 | 10.50 | 290.0 lbs. | 284 | 1565 | 3071 | 5460 |
| | Micro-Air | 0.81 | | | | | 100 | 100 | 100 | 100 |
| 1 | J | 100.00 | 5.25 | 6.0 | −5.87 | −9.0% | 297 | 1125 | 4384 | 6604 |
| | Micro-Air | 0.81 | | | | | 105 | 72 | 143 | 121 |

TABLE III-continued

| Trial | Formula | Dose | Slump | Air | ROH | Water Red. | PSI/Percent 1 Day | 3 Day | 7 Day | 28 Day |
|---|---|---|---|---|---|---|---|---|---|---|
| 99 | Alternate Plain Micro-Air | — 0.81 | 5.00 | 5.8 | 5.00 | −1.0% | 140 49 | 487 31 | 1550 50 | 3675 67 |

Trial #0, concrete samples made and cured at 50° F.
Trials #1 and 99, concrete samples made at 50° F., placed at 28° F., and cured at 28° F. for 1-3 days. All 7 and 28 day samples cured at 50° F.

TABLE IV

| Trial | Formula | Dose[1] | Slump | Air | ROH | Water Red. | PSI/Percent 1 Day | 28 Day |
|---|---|---|---|---|---|---|---|---|
| 0 | Plain | — | 4.88 | 1.6 | 8.75 | 298.0 lbs. | 353 100 | 4959 100 |
| 1 | B | | 5.00 | 2.8 | −4.87 | 9.4% | 328 93 | 6311 128 |
| 2 | C | | 5.25 | 3.3 | −4.75 | 8.7% | 228 65 | 6462 130 |
| 3 | D | | 5.25 | 3.1 | −4.62 | 12.1% | 269 76 | 6425 130 |
| 4 | E | | 5.25 | 3.0 | −4.75 | 6.7% | 228 65 | 6659 134 |
| 5 | F | | 5.25 | 2.4 | −5.00 | 5.0% | 294 83 | 5900 119 |
| 6 | G | | 5.00 | 2.7 | −5.00 | 9.4% | 225 64 | 7125 144 |
| 7 | H | | 5.00 | 2.5 | −4.87 | 8.7% | 276 78 | 6578 133 |
| 8 | I | | 5.00 | 2.8 | −5.37 | 6.4% | 266 75 | 6217 126 |
| 9 | J | | 5.19 | 2.8 | −4.87 | 9.1% | 292 83 | 6378 129 |
| 10 | L | | 5.25 | 3.1 | −4.37 | 14.1% | 318 90 | 6812 137 |
| 11 | M | | 5.25 | 3.5 | −4.87 | 11.7% | 287 81 | 7112 143 |
| 12 | N | | 5.50 | 2.9 | −4.25 | 11.7% | 269 76 | 6184 125 |
| 13 | O | | 5.25 | 2.9 | −4.37 | 13.4% | 232 66 | 6234 126 |
| 14 | P | | 5.00 | 2.4 | −4.62 | 6.7% | 266 75 | 6219 125 |
| 15 | Q | | 5.00 | 2.5 | −4.75 | 7.4% | 256 73 | 6212 125 |
| 16 | R | | 5.25 | 2.7 | −4.50 | 8.1% | 209 59 | 6081 123 |
| 17 | T | | 5.25 | 2.9 | −4.50 | 9.4% | 209 59 | 5787 117 |

Trial #0, concrete samples made, poured and cured at 50° F.
Trials #1 to 17 concrete samples made 50° F., placed and cured at 24° F. for one day, and then cured at 50° F.
[1]Admixture diluted with water up to a convient amount.

TABLE V

| Trial | Formula | Dose | Slump | Air | ROH | Water Red. | PSI/Percent 1 Day | 3 Day | 7 Day | 28 Day |
|---|---|---|---|---|---|---|---|---|---|---|
| 0 | Plain MB-VR | — 1.00 | 3.00 | 5.7 | 5.375 | 267.0 lbs. | 1169 100 | 2887 100 | 4281 100 | 5550 100 |
| 1 | V MB-VR | 30.00 1.64 | 2.00 | 5.2 | −2.125 | 6.7% | 1909 163 | 4056 140 | 5697 133 | 7234 130 |
| 2 | S MB-VR | 60.00 1.59 | 2.25 | 6.0 | −2.625 | 8.2% | 2041 175 | 4268 160 | 5684 133 | 6919 125 |
| 3 | D MB-VR | 90.00 1.49 | 2.25 | 6.4 | −2.875 | 10.5% | 2506 214 | 5228 181 | 6078 142 | 7584 137 |

Trials #0 to 3 concrete samples were all made, placed and cured at 70° F.

| Trial | Formula | Dose[1] | Slump | Air | ROH | Water Red. | PSI/Percent 3 Day | 7 Days | 28 Days |
|---|---|---|---|---|---|---|---|---|---|
| 0 | Plain Micro-Air | 0.88 0.88 | 6.75 6.75 | 5.1 | Frozen | | 915 100 | 2206 100 | 4206 100 |
| 1 | W | | 6.38 | 7.4 | 4.625 | −12.3% | 2548 278 | 4486 203 | 5787 137 |
| 2 | X | | 6.00 | 7.8 | 3.625 | −15.8% | 2693 | 4486 | 5898 |

-continued

| Trial | Formula | Dose(1) | Slump | Air | ROH | Water Red. | PSI/Percent 3 Day | 7 Days | 28 Days |
|---|---|---|---|---|---|---|---|---|---|
|  |  |  |  |  |  |  | 294 | 203 | 140 |
| 3 | Y | 0.58 | 6.50 | 5.5 | 5.125 | −9.5% | 2198 | 3722 | 5401 |
|  | Micro-Air |  |  |  |  |  | 240 | 169 | 130 |
| 4 | Z | 0.66 | 6.30 | 5.8 | 5.875 | −10.5% | 2383 | 4373 | 5646 |
|  | Micro-Air |  |  |  |  |  | 260 | 198 | 134 |
| 5 | AA | 0.35 | 6.25 | 5.9 | 6.5 | −12.6% | 2314 | 5051 | 7118 |
|  | Micro-Air |  |  |  |  |  | 253 | 229 | 169 |
| 6 | BB |  | 6.25 | 6.9 | 6.0 | −12.3% | 2726 | 5146 | 6678 |
|  |  |  |  |  |  |  | 298 | 233 | 159 |
| 7 | CC |  | 6.63 | 5.8 | 5.625 | −10.5% | 2512 | 4678 | 6196 |
|  |  |  |  |  |  |  | 275 | 212 | 147 |
| 8 | DD | 0.40 | 6.50 | 5.3 | 6.750 | −8.1% | 2448 | 4558 | 5925 |
|  | Micro-Air |  |  |  |  |  | 268 | 207 | 141 |
| 99 | Plain |  | 6.38 | 5.3 | 5.380 |  | 1125 | 2207 | 3962 |

Samples 0–8 were made at 35–40° F. cured at variable temperatures from 20–40° F. (3 Day Cure 20–33 F)
Samples 99 (Plain) made and cured at 50° F.

What is claimed is:

1. A cold weather concrete and cement mortar admixture composition consisting essentially of:
   (1) 100 parts by weight of at least one soluble inorganic salt having freezing point depressant properties selected from the group consisting of ammonium, alkali and alkaline earth nitrates and nitrites;
   (2) from 13.3 to 30 parts by weight of at least one water reducing dispersant, selected from the group consisting of an alkali or alkaline earth salt of a napthalene sulphonate/formaldehyde condensate, or a sulphonated melamine/ formaldehyde condensate, or an acrylic copolymer;
   (3) from 3 to 30 parts by weight of at least one inorganic early set and strength accelerator, selected from the group consisting of ammonium, alkali or alkaline earth thiocyanates and thiosulphates; and
   (4) from 0 to 6 parts by weight of at least one organic set accelerator selected from the group consisting of dimethylolurea, mono- and di(N-methylol) hydantoin, mono- and di(N-methylol) dimethylhydantoin, N-methylolacrylamide, tri(N-methylol) melamine, N-hydroxyethylpiperidine, N, N-bis(2-hydroxyethyl)piperazine, glutaraldehyde, pyruvaldehyde, furfural and water soluble urea-formaldehyde resins.

2. The admixture composition according to claim 1 wherein the amount of component (2) is greater than about 15 weight percent of component (1), component (3) is from 5 to 10 parts by weight, and component (4) is from 1.3 to 6 parts by weight.

3. The admixture composition of claim 1 wherein the admixture is in an aqueous solution.

4. The admixture composition according to claim 1 wherein component (1) is calcium nitrate, component (2) is the sodium salt of napthalene sulphonate/formaldehyde condensate, component (3) is sodium thiocyanate.

5. The admixture composition according to claim 1 wherein component (2) is 20 parts by weight, component (3) is 6.7 parts by weight, and component (4) is 4 parts by weight.

6. The admixture composition according to claim 1 wherein component (1) is 50% calcium nitrate and 50% urea; component (2) is selected from the group consisting of an alkali or alkaline earth salt of a napthalene sulphonate/ formaldehyde condensate, or a sulphonated melamine/ formaldehyde condensate, or an acrylic copolymer; component (3) is selected from the group consisting of ammonium alkali or alkaline earth thiocyanates and thiosulphates; and component (4) is selected from the group consisting of dimethylolurea, mono- and di-(N-methyolol) hydantoin, mono- and di(N-methylol) dimethylhydantoin, N-methylolacrylamide, tri(N-methylol) melamine, N-hydroxyethylpiperidine, N,N-bis-(2-hydroxyethyl)piperazine, glutaraldehyde, pyruvaldehyde, furfural and water soluble urea-formaldehyde resins.

7. A cold weather cementitious composition consisting of essentially of:
   (1) a cementitious binder;
   (2) from 0.5 to 4.0 parts by weight per 100 parts of cementitious binder of at least one soluble inorganic salt having freezing point depressant properties selected from the group consisting of ammonium, alkali and alkaline earth nitrates and nitrites;
   (3) from 0.1 to 0.8 parts by weight per 100 parts of cementitious binder of at least one water reducing dispersant selected from the group consisting of an alkali or alkaline earth salt of a napthalene sulphonate/formaldehyde condensate, or a sulphonated melamine/ formaldehyde condensate, or an acrylic copolymer;
   (4) from 0.033 to 0.6 parts by weight per 100 parts of cementitious binder of at least one inorganic early set and strength accelerator selected from the group consisting of ammonium alkali or alkaline earth thiocyanates and thiosulphates; and
   (5) from 0.0 to 0.16 parts by weight per 100 parts of cementitious binder of at least one organic set accelerator selected from the group consisting of dimethylolurea, mono and di(N-methylol) hydantoin, mono- and di(N-methylol) dimethylhydantoin N-methylolacrylamide, tri-(N-methylol) melamine, N-hydroxyethylpiperidine, N.N-bis(2-hydroxyethyl) piperazine, glutaraldehyde, pyruvaldehyde, furfural and water soluble urea-formaldehyde resins.

8. The cementitious composition according to claim 7 wherein component (2) is calcium nitrate, component (3) is condensate, component (4) is sodium thiocyanate, and component (5) is methylolglycoluril.

* * * * *